(12) United States Patent
Sun et al.

(10) Patent No.: US 12,026,442 B2
(45) Date of Patent: Jul. 2, 2024

(54) HYBRID TRAFFIC FLOW MOTION BEHAVIOR MODELING METHOD BASED ON INFERENCE GRAPH

(71) Applicant: TONGJI UNIVERSITY, Shanghai (CN)

(72) Inventors: Jian Sun, Shanghai (CN); Donghao Zhou, Shanghai (CN); Ying Ni, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/326,003

(22) Filed: May 31, 2023

(65) Prior Publication Data

US 2023/0385487 A1 Nov. 30, 2023

(30) Foreign Application Priority Data

May 31, 2022 (CN) .......................... 202210615496.8

(51) Int. Cl.
 *G06F 30/27* (2020.01)
 *G06F 111/10* (2020.01)

(52) U.S. Cl.
 CPC .......... *G06F 30/27* (2020.01); *G06F 2111/10* (2020.01)

(58) Field of Classification Search
 CPC .............................. G06F 30/27; G06F 2111/10
 See application file for complete search history.

(56) References Cited

U.S. PATENT DOCUMENTS

| 11,428,534 | B2* | 8/2022 | Roca Rosero | G06T 7/70 |
| 11,537,134 | B1* | 12/2022 | Wiest | G06N 3/0455 |
| 11,845,464 | B2* | 12/2023 | Agarwal | G06N 3/044 |
| 11,884,282 | B1* | 1/2024 | Pronovost | G06F 18/2148 |
| 11,912,301 | B1* | 2/2024 | Hendy | G06N 3/08 |

(Continued)

OTHER PUBLICATIONS

S. Kumar, Y. Gu, J. Hoang, G. C. Haynes and M. Marchetti-Bowick, "Interaction-Based Trajectory Prediction Over a Hybrid Traffic Graph," 2021 IEEE/RSJ International Conference on Intelligent Robots and Systems (IROS), Prague, Czech Republic, 2021, pp. 5530-5535, doi: 10.1109/IROS51168.2021.9636143. (Year: 2021).*

(Continued)

*Primary Examiner* — Charles L Beard
(74) *Attorney, Agent, or Firm* — JCIPRNET

(57) ABSTRACT

The disclosed relates to a hybrid traffic flow motion behavior modeling method based on an inference graph, wherein the method comprises: obtaining scene information, representing all traffic participants in the scene as vertices, and using directed edges to represent interaction relationships among traffic participants, so as to obtain the interaction graph; obtaining all possible interaction situations according to the interaction graph; based on each possible interaction situation, estimating the trajectory of each traffic participant in the interaction situation, and judging whether the trajectory conforms to a preset empirical decision-making criteria, so as to judge rationality of the interaction situation; and judging the rationality of all possible interaction situations obtained in the interaction situation generation step in turn until an interaction situation satisfying the rationality is found, and taking a trajectory of each traffic participant corresponding to the interaction situation as a final execution trajectory.

6 Claims, 7 Drawing Sheets

(56) References Cited

U.S. PATENT DOCUMENTS

| | | | | |
|---|---|---|---|---|
| 2010/0106603 | A1* | 4/2010 | Dey | G08G 1/096811 |
| | | | | 705/14.63 |
| 2012/0296560 | A1* | 11/2012 | Zheng | G08G 1/0112 |
| | | | | 701/119 |
| 2014/0278052 | A1* | 9/2014 | Slavin | G01C 21/3492 |
| | | | | 701/400 |
| 2018/0300641 | A1* | 10/2018 | Dong | G06Q 20/00 |
| 2019/0310627 | A1* | 10/2019 | Halder | G05D 1/0033 |
| 2019/0310636 | A1* | 10/2019 | Halder | G05D 1/0223 |
| 2019/0391580 | A1* | 12/2019 | Di Cairano | G06N 5/022 |
| 2020/0023842 | A1* | 1/2020 | Gutierrez | G06V 20/58 |
| 2020/0026289 | A1* | 1/2020 | Alvarez | G07C 5/085 |
| 2020/0065711 | A1* | 2/2020 | Clément | B60W 30/0956 |
| 2020/0098269 | A1* | 3/2020 | Wray | G08G 1/166 |
| 2020/0110416 | A1* | 4/2020 | Hong | G05D 1/0221 |
| 2020/0269875 | A1* | 8/2020 | Wray | G01C 21/3691 |
| 2021/0004966 | A1* | 1/2021 | Behrendt | G06T 7/246 |
| 2021/0192748 | A1* | 6/2021 | Morales Morales | |
| | | | | G05D 1/0221 |
| 2021/0237759 | A1* | 8/2021 | Wray | B60W 60/0011 |
| 2021/0302974 | A1* | 9/2021 | Di Cairano | G06N 5/01 |
| 2022/0067405 | A1* | 3/2022 | Kim | G06V 10/82 |
| 2022/0089183 | A1* | 3/2022 | Hwu | G06N 3/088 |
| 2022/0153309 | A1* | 5/2022 | Cui | G05B 13/027 |
| 2022/0176949 | A1* | 6/2022 | Heinzemann | B60W 30/0956 |
| 2022/0245441 | A1* | 8/2022 | Dechene | H04L 41/145 |
| 2022/0245462 | A1* | 8/2022 | Dechene | G06N 3/10 |
| 2022/0247643 | A1* | 8/2022 | Dechene | H04L 45/64 |
| 2022/0274625 | A1* | 9/2022 | Garimella | G06N 3/04 |
| 2022/0383075 | A1* | 12/2022 | Radovic | G06N 3/08 |
| 2022/0410938 | A1* | 12/2022 | Huang | B60W 60/0027 |
| 2023/0071810 | A1* | 3/2023 | Lee | G06N 3/006 |
| 2023/0159027 | A1* | 5/2023 | Pronovost | B60W 60/0027 |
| | | | | 701/26 |
| 2023/0159059 | A1* | 5/2023 | Garimella | B60W 30/0956 |
| | | | | 701/26 |
| 2023/0159060 | A1* | 5/2023 | Garimella | G06N 3/044 |
| | | | | 701/26 |
| 2023/0162470 | A1* | 5/2023 | Garimella | G06V 20/56 |
| | | | | 382/103 |
| 2023/0182782 | A1* | 6/2023 | Zhang | B60W 60/0027 |
| | | | | 701/26 |
| 2023/0219585 | A1* | 7/2023 | Eiras | G05D 1/0214 |
| | | | | 701/25 |
| 2023/0230484 | A1* | 7/2023 | Al Faruque | G06V 10/82 |
| 2023/0367989 | A1* | 11/2023 | Yu | G06N 3/0495 |
| 2023/0391374 | A1* | 12/2023 | Chen | G06N 3/088 |
| 2023/0399023 | A1* | 12/2023 | Li | G08G 1/09626 |
| 2024/0017745 | A1* | 1/2024 | Cao | B60W 60/0027 |
| 2024/0092398 | A1* | 3/2024 | Caldwell | B60W 10/20 |
| 2024/0104335 | A1* | 3/2024 | Cui | G06F 30/20 |
| 2024/0112087 | A1* | 4/2024 | Balasubramaniam | |
| | | | | H04L 41/0853 |

OTHER PUBLICATIONS

A. Ritter, F. Widmer, J. W. Niam, P. Elbert and C. Onder, "Real-Time Graph Construction Algorithm for Probabilistic Predictions in Vehicular Applications," in IEEE Transactions on Vehicular Technology, vol. 70, No. 6, pp. 5483-5498, Jun. 2021, doi: 10.1109/TVT.2021.3077063. (Year: 2021).*

F. Zhou, S. Chen, J. Wu, C. Cao and S. Zhang, "Trajectory-User Linking via Graph Neural Network," ICC 2021—IEEE International Conference on Communications, Montreal, QC, Canada, 2021, pp. 1-6, doi: 10.1109/ICC42927.2021.9500836. (Year: 2021).*

Y. Xie et al., "Virtualized Network Function Forwarding Graph Placing in SDN and NFV-Enabled IoT Networks: A Graph Neural Network Assisted Deep Reinforcement Learning Method," in IEEE Transactions on Network and Service Management, vol. 19, No. 1, pp. 524-537, Mar. 2022, (Year: 2022).*

* cited by examiner

HYBRID TRAFFIC FLOW MOTION BEHAVIOR MODELING METHOD BASED ON INFERENCE GRAPH

CROSS-REFERENCE TO RELATED APPLICATION

This application claims the priority benefit of China application serial no. 202210615496.8, filed on May 31, 2022. The entirety of the above-mentioned patent application is hereby incorporated by reference herein and made a part of this specification.

FIELD OF TECHNOLOGY

The present invention relates to the field of micro-simulation of traffic flows, and in particular to a hybrid traffic flow motion behavior modeling method based on an inference graph.

BACKGROUND TECHNOLOGY

In recent years, Intelligent and Connected Vehicles (ICVs) have developed rapidly, but it will take a long time for all vehicles to realize automatic driving. At this stage, ICVs would interact with human-driven motor vehicles, non-motor vehicles and pedestrians. Hybrid traffic flow motion behavior modeling would be helpful to provide reference for planning decision-making behavior modeling of the ICVs. On one hand, a behavioral model is derived from full cognition of a learning and interaction mechanism of human driving behavior, which can engender an anthropomorphic driving capability for ICVs. On the other hand, a behavior model can be directly applied to traffic simulation, and the traffic simulation, as an important means to test and verify an autonomous driving technology, can effectively provide feedback for development and testing of autonomous driving by realistically reproducing a real road traffic environment.

However, a current idea of micro-traffic behavior modeling is based on lanes, that is, a driving space of traffic participants is a preset lane, and their behaviors are discrete into following behaviors along a lane direction and lane changing behaviors perpendicular to the lane direction. In the face of vehicle interaction, a gap selection model is utilized to determine a priority order of both sides of the interaction. All the existing traffic simulations take the lane as a basic unit for structural modeling of a road network. Even in a shared space without lane division such as intersections, the road network is constructed in the form of virtual lanes. Meanwhile, a large number of priority rules are set at the intersections among lanes, and a traffic flow with a low priority passes through a traffic flow with a high priority according to the gap selection model. In essence, the above approach is inconsistent with characteristics of multiple subjects interacting simultaneously on a continuous plane, non-strict obeying to priority, and complex interaction decision-making mechanism in a hybrid traffic flow intersection scene. It is difficult to meet the requirements of high-precision and high-reliability modeling and simulation. Moreover, it can not provide a highly realistic virtual test traffic flow environment for intelligent vehicles.

SUMMARY OF THE INVENTION

The purpose of the present invention is to overcome the defects in the prior art and provide a hybrid traffic flow motion behavior modeling method based on an inference graph, so as to construct a formal expression and analysis method of a multi-interaction situation by means of the graph. In the inference process, a combination of upstream and downstream relationships among a plurality of objects can be reasonably generated through construction of an inference process to form possible situations. Then, a solution process is constructed by combining a following model, a decision-making model and a planning model to obtain a reasonable planning decision-making result.

The purpose of the present invention can be realized by the following technical solution:

A hybrid traffic flow motion behavior modeling method based on an inference graph, wherein the method comprises the following steps:

an interaction graph construction step: obtaining scene information, representing all traffic participants in the scenario as vertices, and using directed edges to represent interaction relationships among traffic participants, so as to obtain the interaction graph;

an interaction situation generation step: obtaining all possible interaction situations according to the interaction graph;

a rationality judgment step: obtaining an interaction situation from the interaction situation generation step, estimating the trajectory of each traffic participant in the interaction situation, and judging whether the trajectory conforms to a preset empirical decision-making criterion, so as to judge rationality of the interaction situation; and a circular execution step: executing the rationality judgment step in a circular manner, and judging the rationality of all possible interaction situations obtained in the interaction situation generation step in turn until an interaction situation satisfying the rationality is found, and taking a trajectory of each traffic participant corresponding to the interaction situation as a final execution trajectory.

Further, the interaction relationships in the interaction graph construction step are specifically expressed as follows:

defining that two individuals having linear overlap characteristics on future driving trajectories are said to have a physical interaction relationship, wherein the two individuals are connected by a one-way solid line, and an arrow direction represents an upstream and downstream relationship; and defining that two individuals having an intersection point on future driving trajectories are said to have a logical interaction relationship, wherein since the upstream and downstream relationship has not been determined, the two individuals are connected by a two-way dotted line.

Further, the interaction situation generation step is specifically as follows:

considering a turning vehicle as a core interaction object, when there is only one core interaction object in the scene, determining a gap in each traffic flow, and from a perspective of the core interaction object, adopting a depth-first strategy from a downstream gap to an upstream gap to determine a possible interaction situation;

when there are two or more core interaction objects in the scene, putting a core interaction object into the interaction graph firstly to determine a possible interaction situation, and then adding other core interaction objects in turn to the determined interaction situation to further determine a possible interaction situation; and if a core interaction object added later affects downstream traffic participants of a previous core interaction object, removing the affected core interaction object from the interaction graph, re-determining an interaction relationship, and then adding the removed core interaction object into the interaction graph to obtain a final interaction situation.

Further, different traffic flows are determined according to types of the traffic participants.

Further, in the rationality judgment step, a trajectory estimation process of each traffic participant is specifically as follows:

utilizing a fourth-order Bessel curve to represent movement paths of the traffic participants; and utilizing an intelligent driver model as a speed planning model to determine speeds of the traffic participants.

Further, five control points are used to determine a shape of the fourth-order Bessel curve, and a calculation expression of the shape of the curve is as follows:

$$B(u) = \sum_{i=0}^{4} b_{i,n}(u) B_i$$

$$b_{i,n}(u) = C_n^i u^i (1-u)^{n-i}$$

wherein B(u) represents points of the curve when the parameter u changes in an interval [0,1], and is a two-dimensional matrix containing x and y coordinates of all points, i.e., B(u)=[$B_x$(u),$B_y$(u)]; B(0) and B(1) are two ends of the curve; $B_i$=($X_i$,$Y_i$) is a control point of the Bessel curve; $b_{i,n}$(u) is a Bornsky polynomial.

Further, a quadratic power sum of curvature change is selected as an objective function for planning of the paths, and constraints are set to ensure continuity of curve endpoints, and a calculation expression of the objective function is as follows:

$$\min F = \int_0^1 B_x'''(u)^2 + B_y'''(u)^2 du$$

calculation expressions of the constraints are as follows:

$$\begin{cases} B_0 = (x_s, y_s) \\ B_4 = (x_e, y_e) \\ B'(0) = d_s[\cos(\theta_s), \sin(\theta_s)] \\ B'(1) = d_e[\cos(\theta_s), \sin(\theta_s)] \\ k(0) = k_s \\ k(1) = k_e \end{cases}$$

wherein ($x_s$,$y_s$) is coordinates of a starting point; ($x_e$,$y_e$) is coordinates of an end point; $\theta_s$ is an direction angle of the starting point; $k_s$ is a curvature of the starting point; and $k_s$ is a curvature of the end point.

Further, a determination process of the speeds of the traffic participants is specifically as follows:

if there is no other object in a downstream of the current object, considering that the current object travels in accordance with an expected acceleration; and if there are other objects in the downstream of the current object, utilizing the IDM as a following model, and determining a speed of the current object based on an object ahead thereof, wherein a calculation expression of an acceleration of the current object determined according to the IDM model is as follows:

$$a_{IDM}(s, v, \Delta v) = a_{max}\left[1 - \left(\frac{v}{v_d}\right)^\delta - \left(\frac{s^*(v, \Delta v)}{s}\right)^2\right]$$

$$s^*(v, \Delta v) = s_0 + vT + \frac{v\Delta v}{2\sqrt{a_{max}a_{dd}}}$$

wherein $a_{IDM}$(s,v,$\Delta$v) is an acceleration of the current object determined according to the IDM model; $a_{max}$ is a maximum acceleration; $a_{dd}$ is an expected deceleration; $v_d$ is an expected speed; $\delta$ is a free acceleration index, s*(v,$\Delta$v) is an effective minimum gap; $s_0$ is a minimum stopping distance; T is an expected time interval; $a_{dd}$ is an expected deceleration, v is a speed of the current vehicle, and $\Delta$v is a speed difference between the front vehicle and the current vehicle.

Further, in the rationality judgment step, the decision-making criteria comprises: from a perspective of the current traffic participant, selecting waiting time and delay to make an interaction decision-making; and from a perspective of other interaction objects, selecting cooperative acceleration and delay to make an interaction decision-making.

Further, calculation expressions of the cooperative acceleration and delay are as follows:

$$a_c = \begin{cases} \frac{v_I^2}{2d_I}, & d_I < 0.5v_I t_E \\ 2\frac{v_I t_E - d_I}{t_E^2}, & 0.5v_I t_E \leq d_I < v_I t_E \\ 2\frac{d_I - v_I t_E}{t_E^2}, & v_I t_E \leq d_I \end{cases}$$

$$D = \begin{cases} t_E + \frac{v_E}{a_{da}} - \frac{d_E}{v_I}, & d_I < 0.5v_I t_E \\ 0.5t_E + \frac{v_E}{a_{da}} - \frac{d_E}{a_{da}t_E}, & 0.5v_I t_E \leq d_I < v_I t_E \\ 0, & v_I t_E < d_I \end{cases}$$

wherein $a_c$ is the cooperative acceleration of interaction object, D is the delay caused by the interaction object giving way to the current vehicle, and $v_1$ is a current speed of the interaction object; $d_1$ is a distance between the interaction object and a conflict point; $t_E$ is the time when the current vehicle arrives at the conflict point; $d_E$ is a distance between the current vehicle and the conflict point; and $a_{da}$ is an expected acceleration of the vehicle; and utilizing a decision-making tree method to establish the decision-making criteria for learning the behavior of both parties of interaction from empirical data.

DESCRIPTION OF THE EMBODIMENTS

Figure 1:
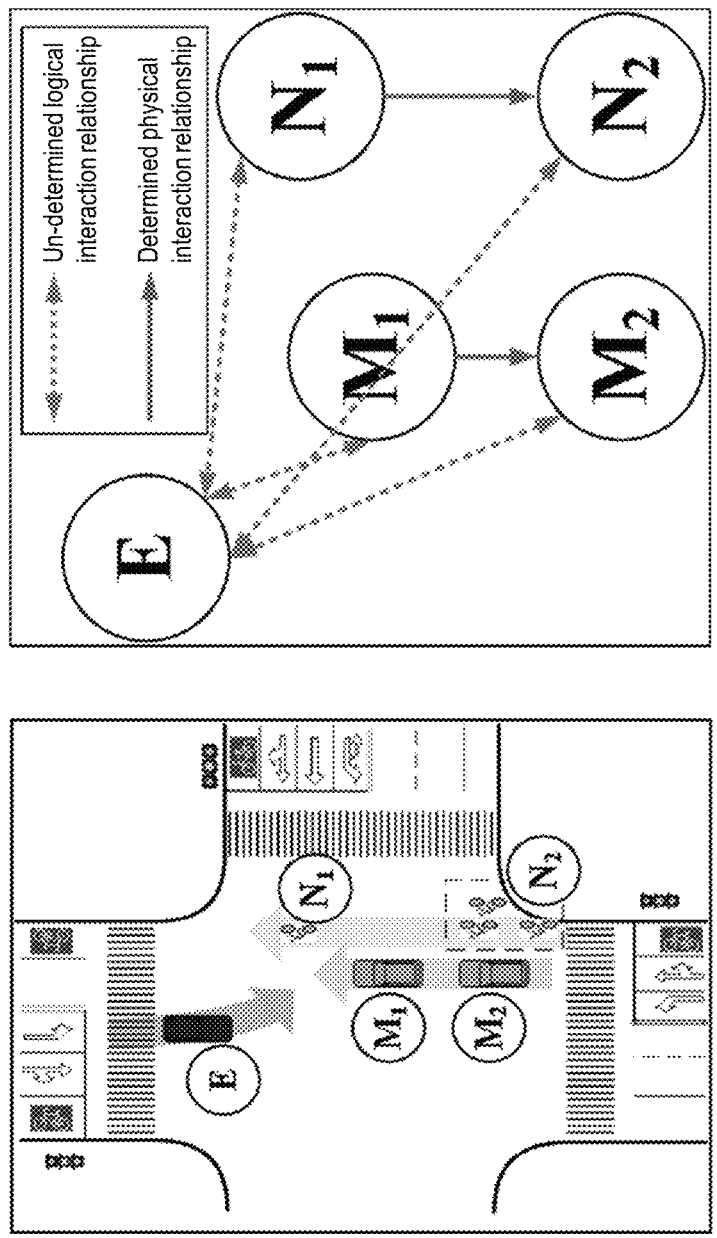
FIG. 1 is a scenario diagram and a constructed interaction graph of a hybrid traffic flow motion behavior modeling method based on an inference graph provided in an embodiment of the present invention.

In order to make the purpose, technical solution and advantages of the embodiments of the present invention clearer, the technical solution in the embodiments of the present invention will be described clearly and completely in combination with drawings accompanying the embodiments of the present invention. Obviously, the described embodiments are a part of the embodiments of the present invention, but not all the embodiments. Components of the embodiments of the present invention generally described and shown in the drawings herein may be laid out and designed in a variety of different configurations.

Therefore, the following detailed description of embodiments of the present invention provided in the drawings is not intended to limit the scope of the present invention which is claimed for protection, but merely represents selected embodiments of the present invention. Based on the embodiments of the present invention, all other embodiments obtained by an ordinary person skilled in the art without creative work are within the protection scope of the present invention.

It should be noted that similar labels and letters indicate similar items in the drawings below, so that once an item is defined in one drawing, no further definition or explanation is required in subsequent drawings.

This solution constructs a formal expression and analysis method of multi-interaction scenario by the way of graphs. In a process of scenario analysis, a combination of upstream and downstream relationships among a plurality of objects can be reasonably generated through construction of an inference process to form possible scenarios. Then, a solution process is constructed by combining a following model, a decision-making model and a planning model to obtain a reasonable planning decision-making result. Specific steps are as follows:

S1: proposing an interaction graph based on a graph theory to represent the multi-interaction object scenario.

S11: representing all traffic participants in the scenario as vertices. The interaction graph G in the multi-interaction object scenario is consisted of n traffic participants $A=\{A_1, A_2, \ldots, A_n\}$, comprising i motor vehicles $M=\{M_1, M_2, \ldots, M_i\}$, j non-motor vehicles $N=\{N_1, N_2, \ldots, N_j\}$ and k pedestrians $P=\{P_1, P_2, \ldots, P_k\}$. Meanwhile, directed edges are used to represent relationships from downstream traffic participants to upstream traffic participants. Two individuals having linear overlap characteristics on future driving trajectories are said to have a physical interaction relationship $E_P(A_i,A_j)$, pointing from a downstream individual $A_i$ to an upstream individual $A_j$. Two individuals having an intersection point (point overlap characteristics) on future driving trajectories are said to have a logical interaction relationship $E_I(A_i,A_j)$, wherein since the logical interaction relationship has not been determined, a two-way edge connection is utilized. The physical interaction relationship can be directly identified through a movement process of the traffic participants, while the logical interaction relationship needs to be determined through the inference process by choosing reasonable upstream and downstream relationships (i.e., interaction situations).

S2: constructing an inference graph frame to analyze interaction relationships and determine the interaction situations.

The logical interaction relationship is common in confluence and traversal scenarios, where one traffic participant is associated with a plurality of interaction objects, which forms a variety of interaction situations. However, among these possible traffic situations, only a few situations in line with local driving habits should be selected and presented by simulation. Therefore, an inference method is established to select the most reasonable traffic scenario from possible situations, i.e., the inference graph frame.

S21: establishing two processes in an inference graph model, which are an inference process and a solution process. The inference process is responsible for generating all possible traffic situations for the current traffic scenario. These traffic situations are often generated from the perspective of core interaction objects. The core interaction object is a common vertex E contained within a set of logical interaction relationships $\{E_{I,1}(E,M_1), E_{I,2}(M_1,E), \ldots, E_{I,2i-1}(E,M_i), E_{I,2i}(M_i,E)\}$ in the interaction graph. The analysis of interaction situations from the perspective of core interaction objects can be used to more comprehensively analyze the current interaction problem. Then, these traffic scenarios are ranked according to traffic efficiency of the core interaction objects from the highest one to the lowest one.

S22: analyzing the feasibility of each situation in the solution process based on the possible situations generated by the inference process. The solution process consists of a prediction module for a logic front vehicle, a planning module for a core interaction object and a decision-making module for a logic behind vehicle. A final result of judgment on the logical behind vehicle priority is taken as a final result of whether the current interaction situation is feasible.

S3: performing an inference process

S31: when there is only one core interaction object in the scene, determining that the interaction upstream and downstream relationships can be transformed into a gap selection problem for solving; utilizing a depth-first search strategy from a downstream gap to an upstream gap; and once one path is accepted by the solution process, naturally pruning other routes.

S32: when there are two or more core interaction objects in the scene, proposing in this solution an inference method of "graph out and graph in +" to realize fast inference under multi-core interaction objects.

Firstly, a core interaction object is incorporated into the inference graph model to determine an optimal interaction situation between this object and other interaction objects.

The others are then added one by one to the determined situation. If a core interaction object added later affects downstream traffic participants of a previous core interaction object, removing the affected core interaction object from the interaction graph, and re-considering the affected relationship.

The interaction object is removed because the changed graph structure affects the movement of downstream individuals, which may further affect the decision-making and planning of upstream interaction objects. When all logical interaction relationships are determined, the inference process is terminated. This scenario is considered to be the one without an internal logical conflict and is output.

S4: given a variety of scenarios obtained by inference, determining, by the scenario solution process, the trajectory of each traffic participant under each scenario. The process has two main modules: trajectory planning and decision-making. The trajectory planning module is to determine a trajectory of other traffic objects which are located downstream of the core interaction object and are not affected by the core interaction object. In addition, it is to design a driving trajectory for the core interaction object, wherein the driving trajectory needs to be comfortable and efficient in accordance with habits of a driver while giving way to a plurality of downstream interaction objects. The decision-making module estimates a planned trajectory according to an interaction decision-making rule to reproduce an anthropomorphic decision-making behavior. If the solution of the current traffic scenario is valid, then the trajectories of the other interaction objects in upstream of the core interaction object is planned according to the method of the prediction module. Conversely, the same process is used to solve for the next interaction situation.

S41: dividing the trajectory planning into two steps of path prediction and speed prediction.

S411: performing the path planning

The path planning designs an optimal curve for each traffic participant, utilizes a fourth-order Bessel curve, and determines the shape of the curve with five control points, as shown in the following formula:

$$B(u) = \sum_{i=0}^{4} b_{i,n}(u)B_i$$
$$b_{i,n}(u) = C_n^i u^i (1-u)^{n-i}$$

wherein B(u) represents points of the curve when the parameter u changes in an interval [0,1], and is a two-dimensional matrix containing x and y coordinates of all points, i.e., $B(u)=[B_x(u),B_y(u)]$; B(0) and B(1) are two ends of the curve; $B_i=(X_i,Y_i)$ is a control point of the Bessel curve; $b_{i,n}(u)$ is a Bornsky polynomial.

Meanwhile, the path planning selects a quadratic power sum of curvature changes as an objective function, namely:

$$minF=\int_0^1 B_x'''(u)^2+B_y'''(u)^2 du$$

Constraints are set to ensure continuity of curve endpoints, comprising:

$$\begin{cases} B_0 = (x_s, y_s) \\ B_4 = (x_e, y_e) \\ B'(0) = d_s[\cos(\theta_s), \sin(\theta_s)] \\ B'(1) = d_e[\cos(\theta_s), \sin(\theta_s)] \\ k(0) = k_s \\ k(1) = k_e \end{cases}$$

wherein $(x_s,y_s)$ is coordinates of a starting point; $(x_e,y_e)$ is coordinates of an end point; $\theta_s$ is a direction angle of the starting point; $k_s$ is a curvature of the starting point; and $k_s$ is a curvature of the end point.

S412: dealing with the following two situations of vehicle driving states: (1) there is no other object in downstream of the object; and (2) there are other objects in downstream of the object, and the object needs to follow the other objects. For situation (1), the present invention considers that the interaction front vehicle drives in accordance with an expected accelerated motion. For situation (2), the IDM is used as the following model to determine the speed of vehicle.

According to the IDM model, the acceleration of the behind vehicle is given by the following formula:

$$a_{IDM}(s, v, \Delta v) = a_{xmax}\left[1-\left(\frac{v}{v_d}\right)^\delta - \left(\frac{s^*(v, \Delta v)}{s}\right)^2\right]$$

$$s^*(v, \Delta v) = s_0 + vT + \frac{v\Delta v}{2\sqrt{a_{max}a_{dd}}}$$

wherein $a_{max}$ is a maximum acceleration; $a_{dd}$ is an expected deceleration; $v_d$ is an expected speed; $\delta$ is a free acceleration index and shows the law of acceleration decreasing with speed; $s^*(v,\Delta v)$ is an effective minimum gap; $s_0$ is a minimum stopping distance; T is an expected time interval; $a_{dd}$ is an expected deceleration, v is a speed of the current vehicle, and $\Delta v$ is a speed difference between the front vehicle and the current vehicle.

S42: Judging Scenario Rationality

Firstly, based on empirical analysis, a decision-making criterion of human drivers (i.e., going first or giving way to the interaction object) is explored. From the perspective of driver of the current vehicle, waiting time $T_E$ and delay $D_E$ thereof are selected as part of influencing variables, which respectively represent patience of the driver and efficiency loss thereof. From the perspective of other interaction objects, expected cooperative accelerations $a_c$ and their delays D are selected as influencing factors of an interaction decision-making behavior.

In different initial states, variation rules and solution formulas of cooperative accelerations and delays are different, which can be discussed in three situations, that is, the interaction vehicle needs to stop and give way to the current vehicle, the interaction vehicle needs to slow down and give way to the current vehicle, and the interaction vehicle can accelerate and give way to the current vehicle. The cooperative accelerations and delays in the three situations can be obtained by the following formulas:

$$a_c = \begin{cases} \dfrac{v_I^2}{2d_I}, & d_I < 0.5v_I t_E \\ 2\dfrac{v_I t_E - d_I}{t_E^2}, & 0.5v_I t_E \le d_I < v_I t_E \\ 2\dfrac{d_I - v_I t_E}{t_E^2}, & v_I t_E \le d_I \end{cases}$$

$$D = \begin{cases} t_E + \dfrac{v_E}{a_{da}} - \dfrac{d_E}{v_I}, & d_I < 0.5v_I t_E \\ 0.5t_E + \dfrac{v_E}{a_{da}} - \dfrac{d_E}{a_{da} t_E}, & 0.5v_I t_E \le d_I < v_I t_E \\ 0, & v_I t_E < d_I \end{cases}$$

wherein $v_I$ is a current speed of the interaction object; $d_I$ is a distance between the interaction object and a conflict point; $t_E$ is the time when the current vehicle arrives at the conflict point; $d_E$ is a distance between the current vehicle and the conflict point; and $a_{da}$ is an expected acceleration of the vehicle.

A decision-making tree method is utilized to establish the decision-making criteria for learning the behavior of both parties of interaction from empirical data, and a result is as follows:

$$Y = \begin{cases} 1, & \text{if } (a_c > -0.15) \text{ or } (a_c > -0.15 \text{ and } D < 3.39) \\ 0, & \text{if } (a_c < -0.15 \text{ and } D > 3.39) \end{cases}$$

wherein Y is a decision-making result of both parties of interaction. When Y is 1, the interaction vehicle gives way and the current vehicle goes first; and when Y is 0, the interaction vehicle goes first and the current vehicle gives way.

If a certain interaction relationship does not satisfy, it is considered that this situation does not satisfy the decision-making criteria of real drivers and should be abandoned. The next potential situation should be analyzed until a scenario in which all interaction relationships satisfy the decision-making criteria of human drivers is found.

S5: Executing the Situation

A certain situation is deduced in step S3, the trajectory of each participant in this situation is planned through step S41, and the rationality of the situation is judged by applying the decision-making method of S42. This process is repeated until a certain situation is found to be reasonable, and then the inference and solving would be stopped. This situation is the optimal scenario, and the trajectory solved based on this situation is the final execution trajectory.

Embodiment 1

Considering an intersection with two phases without a left turn protection phase, taking a case where the current vehicle E passes the intersection by turning left as an example (as shown in FIG. 1), the inference graph is illustrated and the interaction relationships are analyzed to make a reasonable decision-making. (1) The interaction graph is applied to represent the two phase intersection scene The interaction graph is shown in FIG. 1. The current vehicle E has an intention to turn left, while motor vehicles $M_1$ and $M_2$ and non-motor vehicles groups $N_1$ and $N_2$ go straight through the intersection. Non-motor vehicles and pedestrians should first be processed by clustering. Non-motor vehicles and pedestrians of which longitudinal distances are less than widths of motor vehicles and transverse distances are less than the lengths of motor vehicles should be treated as a group. In the scene shown in FIG. 1, non-motor vehicle group $N_2$ is treated as a group. For the current vehicle E, there are potential conflict points between going straight motor vehicles and going straight non-motor vehicles in the scene and a driving direction of the current vehicle, so these traffic participants are interaction objects. Meanwhile, the going straight motor vehicle $M_2$ is following $M_1$ and the going straight non-motor vehicle group $N_2$ is following $N_1$. In the interaction graph, the above two physical interaction relationships are represented by directed edges ($M_1$,$M_2$) and ($N_1$,$N_2$) of solid lines in the diagram. In addition, the interaction relationships between this vehicle and other going straight traffic participants have not been determined, and all possible situations are represented by directed edges of dotted lines.

(2) constructing the inference graph frame to analyze the interaction relationships and determine the interaction situations. For the scene shown in FIG. 1, the inference graph frame is constructed, as shown in FIG. 2.

A traffic scenario may have several situations running. The inference process is responsible for generating all possible traffic situations for the current traffic scene. Taking a turning vehicle passing the intersection shown in the FIG. 2 as an example, traffic participants may pass according to a situation 1, that is, a left-turning vehicle E has the priority over the going straight motor vehicles and non-motor vehicles to pass through the intersection, or they may pass according to a situation 2, that is, the left-turning vehicle E has the priority over the $M_1$ to pass through, and then gives way to $N_1$ and passes before $N_2$. And so on until all situations.

Figure 2:
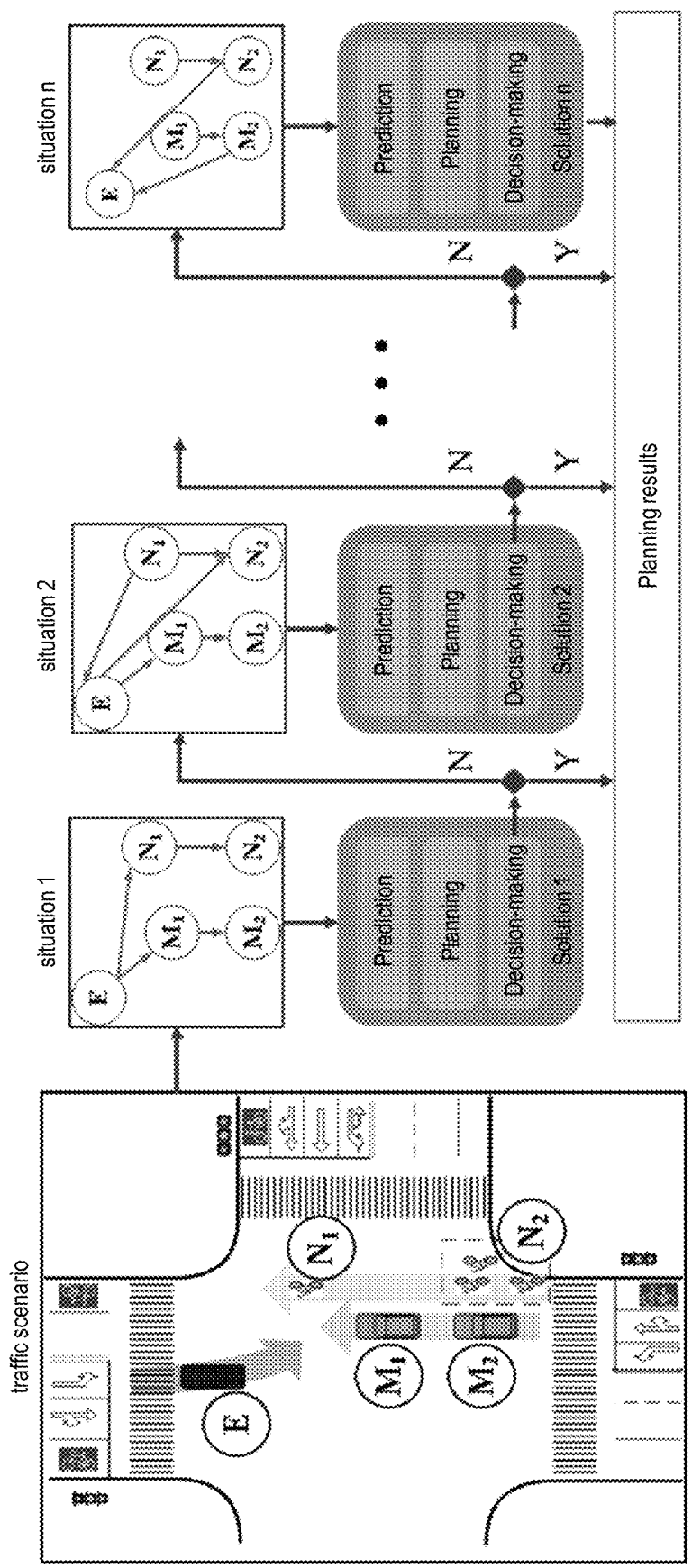
FIG. 2 is a frame diagram of inference graph in the hybrid traffic flow motion behavior modeling method based on the inference graph provided in the embodiment of the present invention.

In FIG. 2, one turning vehicle may correspond to a plurality of going straight traffic participants, while one going straight traffic participant corresponds to only one turning vehicle. Therefore, a turning vehicle is considered as a core interaction object. Then, these traffic situations are ranked according to traffic efficiency of the core interaction objects from the highest one to the lowest one. For example, in FIG. 2, the core interaction object E of situation 1 is least affected by going straight traffic flows, while E in situation n needs to give way to all interaction objects, which has the lowest efficiency.

(3) Performing the Inference Process Based on the Constructed Inference Graph

When there is only one core interaction object in the scene, it is determined that the interaction upstream and downstream relationships can be transformed into a gap selection problem for solving. Also taking a simple scenario with a left turn vehicle as shown in FIG. 1, the interaction determination problem is transformed into a gap selection problem Referring to FIG. 3.

Figure 3:
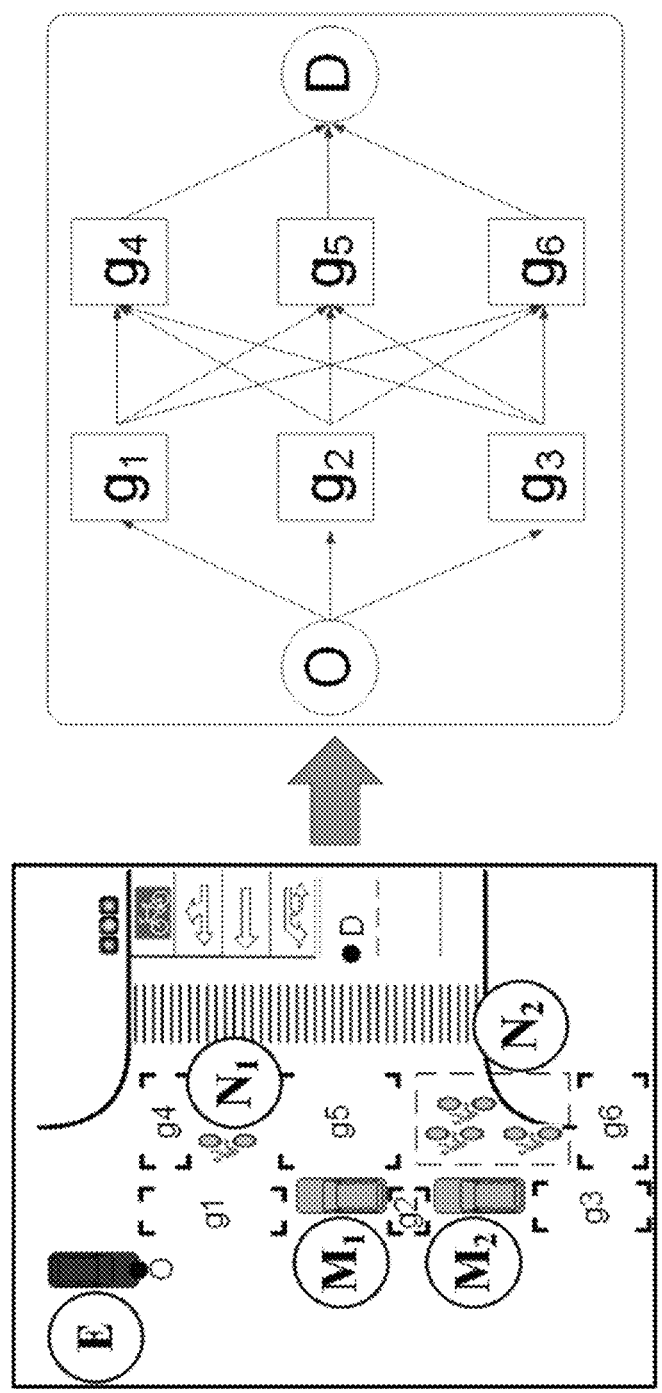
FIG. 3 is a diagram of a gap selection problem converted from an interaction relationship problem of the hybrid traffic flow motion behavior modeling method based on the inference graph provided in the embodiment of the present invention.

The core interaction object in FIG. 3 is a left-turning vehicle E. Selecting the interaction relationship with the going straight vehicles by the left-turning vehicle is equivalent to the gap selection in the going straight vehicle flows. For example, when the left-turning vehicle expects to be ahead of the going straight vehicle $M_1$, it is equivalent to select $g_1$ to pass through. Therefore, all possible interaction situations of the core interaction object passing through the intersection can be obtained by traversing the gap selection situations.

Figure 4:
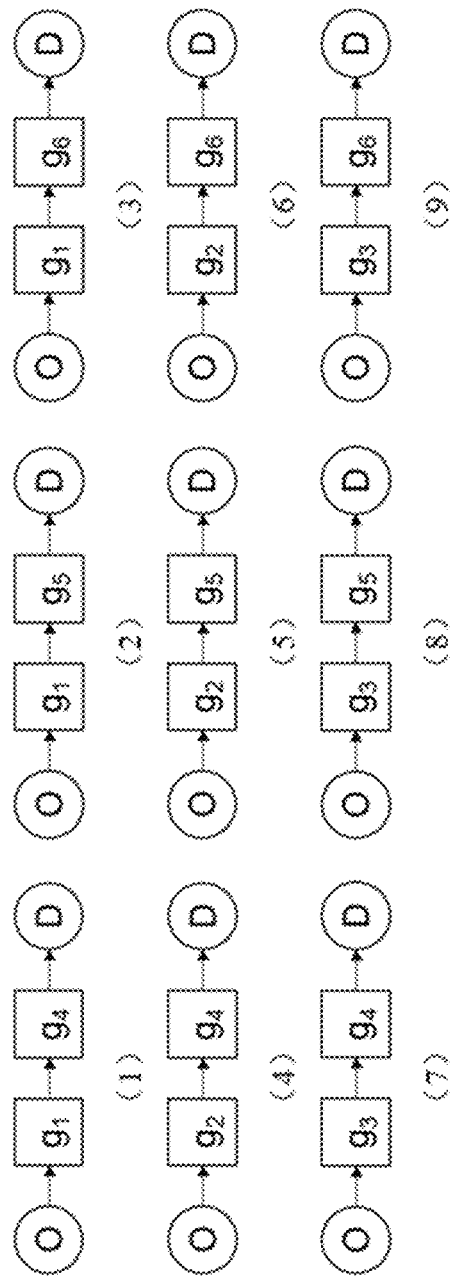
FIG. 4 is an alternative scheme diagram of the gap selection problem of the hybrid traffic flow motion behavior modeling method based on the inference graph provided in an embodiment of the present invention.

The interaction scene is transformed into a gap selection network, as shown in the right figure of FIG. 3. In the figure, point O is the location of the core interaction object, point D is the location where the core interaction object expects to drive out of the intersection, and a path from point O to point D is a traffic scenario in which the intersection is passed through. Nodes in the network are optional gaps. In the gaps of the same traffic flow, for example, $g_1$, $g_2$, and $g_3$, only one can be selected to pass through. Moreover, these gaps are arranged from top to bottom in the order of being encountered by the core interaction. Through the depth-first traversal process, all paths generated by the gap network shown in FIG. 4 are shown below, corresponding to 9 interaction situations respectively.

Figure 5:
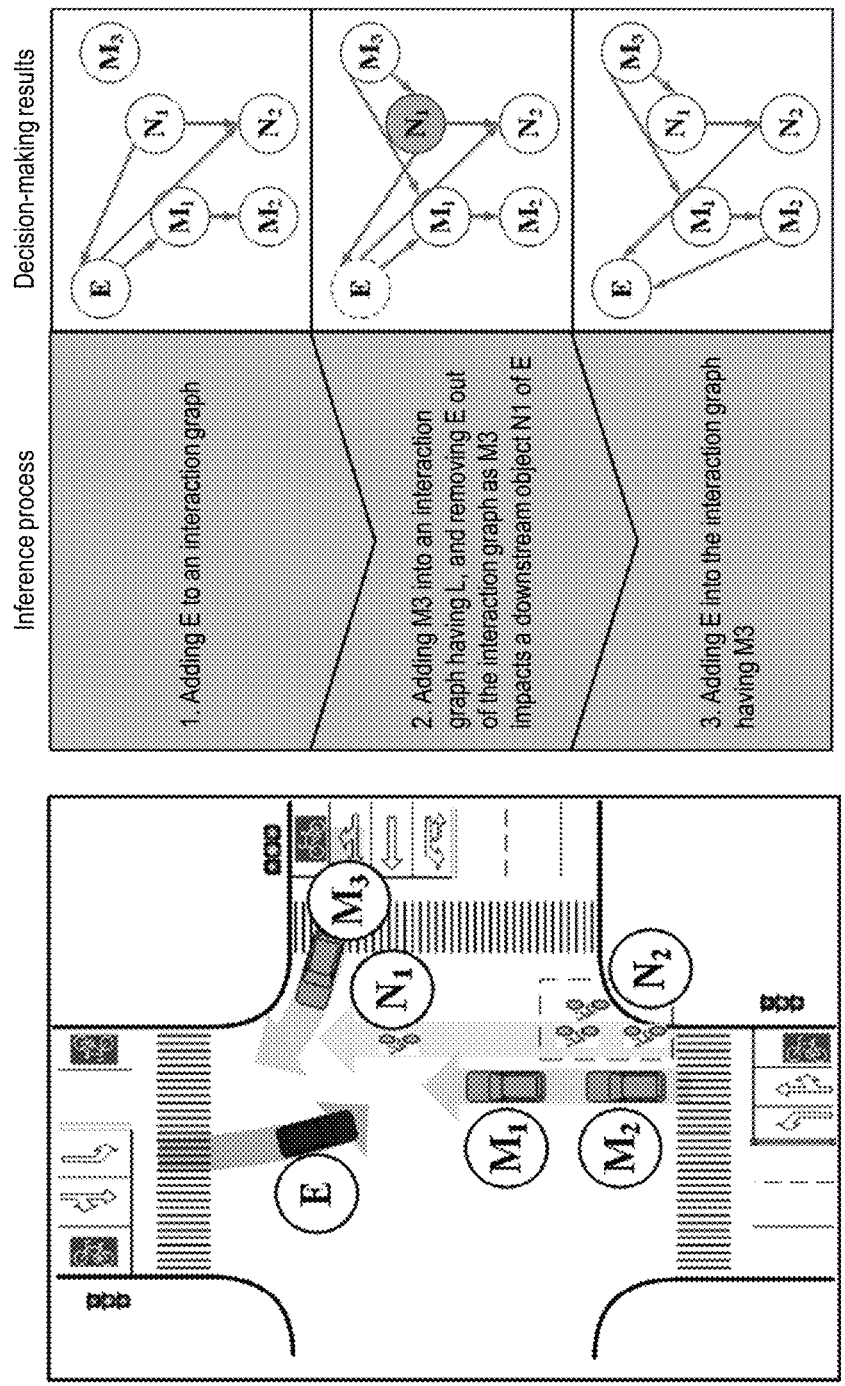
FIG. 5 is a schematic diagram of inference steps of the hybrid traffic flow motion behavior modeling method based on the inference graph provided in the embodiment of the present invention when a plurality of turning vehicles coexist.

When there are two or more core interaction objects in the scenario shown in FIG. 1, as shown in FIG. 5, the core interaction object in the scene is not only the left-turning vehicle E, but also a right-turning vehicle $M_3$. The inference solution designed by the present invention is as follows: firstly, a core interaction object is incorporated into the inference graph model to determine an optimal interaction situation between this object and other interaction objects. The others are then added one by one to the determined situation. If a core interaction object added later affects downstream traffic participants of a previous core interaction object, removing the affected core interaction object from the interaction graph, and re-considering the affected relationship. The interaction object is removed because the changed graph structure affects the movement of downstream individuals, which may further affect the decision-making and planning of upstream interaction objects. For example, in FIG. 5, the addition of $M_3$ affects the downstream $N_1$ of E. According to the inference rule, it is necessary to remove E out of the interaction graph and re-add E into the interaction graph having $M_3$. In the process of re-adding L, the impact of $M_3$ to $N_1$ is considered, and a more reasonable decision-making and planning result is made, so as to avoid the occurrence of abnormal driving behaviors. When all logical interaction relationships are determined, the inference process is terminated.

(4) Performing a Solving Process (4.1.1) Performing the Path Planning

The path planning designs an optimal curve for each traffic participant. The Bessel curve has simplicity of form and continuity of curvature. By balancing the number and complexity of constraints, the fourth-order Bessel curve is selected and its shape is determined by five control points.

$$B(u) = \sum_{i=0}^{4} b_{i,n}(u) B_i$$

$$b_{i,n}(u) = C_n^i u^i (1-u)^{n-i}$$

wherein B(u) represents points of the curve when the parameter u changes in an interval [0,1]; B(0) and B(1) are two ends of the curve; $B_i = (X_i, Y_i)$ is a control point of the Bessel curve; $b_{i,n}(u)$ is a Bornsky polynomial.

Meanwhile, A quadratic power sum of curvature changes is selected as an objective function, namely:

$$\min F = \int_0^1 x'''(u)^2 + y'''(u)^2 du$$

Constraints are set to ensure continuity of curve endpoints, comprising:

$$\begin{cases} B_0 = (x_s, y_s) \\ B_4 = (x_e, y_e) \\ B'(0) = d_s[\cos(\theta_s), \sin(\theta_s)] \\ B'(1) = d_e[\cos(\theta_s), \sin(\theta_s)] \\ k(0) = k_s \\ k(1) = k_e \end{cases}$$

wherein $(x_s, y_s)$ is coordinates of a starting point; $(x_e, y_e)$ is coordinates of an end point; $\theta_s$ is a direction angle of the starting point; $k_s$ is a curvature of the starting point; and $k_s$ is a curvature of the end point.

(4.1.2) dealing with the following two situations of vehicle driving states: (1) there is no other object in downstream of the object; and (2) there are other objects in downstream of the object, and the object needs to follow the other objects. For situation (1), the research considers that the interaction front vehicle drives in accordance with an expected accelerated motion. For situation (2), the influence of following effect should be fully considered in the speed prediction of downstream interaction objects. Here, the IDM is used as the following model to determine the speed of vehicle.

According to the IDM model, the acceleration of the behind vehicle is given by the following formula:

$$a_{IDM}(s, v, \Delta v) = a_{xmax}\left[1 - \left(\frac{v}{v_d}\right)^\delta - \left(\frac{s^*(v, \Delta v)}{s}\right)^2\right]$$

$$s^*(v, \Delta v) = s_0 + vT + \frac{v\Delta v}{2\sqrt{a_{max} a_{dd}}}$$

wherein $a_{max}$ is a maximum acceleration; $a_{dd}$ is an expected deceleration; $v_d$ is an expected speed; $\delta$ is a free acceleration index and shows the law of acceleration decreasing with speed; $s^*(v, \Delta v)$ is an effective minimum gap; $s_0$ is a minimum stopping distance; T is an expected time interval; and $a_{dd}$ is an expected deceleration.

(4.2) Performing a Decision-Making Method

Expected cooperative accelerations $a_c$ and their delays D are selected as influencing factors of an interaction decision-making behavior.

In different initial states, variation rules and solution formulas of cooperative accelerations and delays are different, which can be discussed in three situations, that is, situation 1 means that the interaction vehicle needs to stop and give way to the current vehicle, situation 2 means that the interaction vehicle needs to slow down and give way to the current vehicle, and situation 3 means that the interaction vehicle can accelerate and give way to the current vehicle. The solution method of cooperative accelerations and delays under different situations are as follows:

$$a_c = \begin{cases} \dfrac{v_I^2}{2d_I}, & d_I < 0.5 v_I t_E \\ 2\dfrac{v_I t_E - d_I}{t_E^2}, & 0.5 v_I t_E \leq d_I < v_I t_E \\ 2\dfrac{d_I - v_I t_E}{t_E^2}, & v_I t_E \leq d_I \end{cases}$$

$$D = \begin{cases} t_E + \dfrac{v_E}{a_{da}} - \dfrac{d_E}{v_I}, & d_I < 0.5 v_I t_E \\ 0.5 t_E + \dfrac{v_E}{a_{da}} - \dfrac{d_E}{a_{da} t_E}, & 0.5 v_I t_E \leq d_I < v_I t_E \\ 0, & v_I t_E < d_I \end{cases}$$

wherein $v_I$ is a current speed of the interaction object; $d_I$ is a distance between the interaction object and a conflict point; $t_E$ is the time when the current vehicle arrives at the conflict point; $d_E$ is a distance between the current vehicle and the conflict point; and $a_{da}$ is an expected acceleration of the vehicle.

A decision tree method is utilized to establish the decision rule for learning the behavior of both parties of interaction from empirical data. Based on actual collected vehicle trajectory data at an intersection of Xianxia Road and Jianhe Road, this decision-making tree model is trained, and decision-making results are as follows: (1) when a cooperative acceleration of the going straight vehicle is greater than −0.152 m/s2, 89.6% of the samples have a final result of passing the intersection with priority. (2) when the cooperative acceleration required by the going straight vehicle is greater than 0.152 and the delay of the going straight vehicle is less than 3.4 s, that is, when the left-turning behavior has a certain impact on the safety of the going straight vehicle, but its impact on the efficiency of the going straight vehicle is relatively small, 60.6% of the samples choose to pass through. (3) when an absolute value of the cooperative acceleration of the going straight vehicle is greater than 0.152 and the delay of the going straight vehicle is greater than 3.4 s, that is, when the left-turning behavior has a serious impact on both the safety and efficiency of the going straight vehicle, 98.5% of the samples choose to give way.

The specific decision-making tree model result is as follows:

$$Y = \begin{cases} 1, \text{ if } (a_c > -0.15) \text{ or } (a_c > -0.15 \text{ and } D < 3.39) \\ 0, \text{ if } (a_c < -0.15 \text{ and } D > 3.39) \end{cases}$$

wherein Y is a decision-making result of both parties of interaction one by one. When Y is 1, the interaction vehicle gives way and the current vehicle goes first; and when Y is 0, the interaction vehicle goes first and the current vehicle gives way.

(5) Executing the Situation

Figure 6:
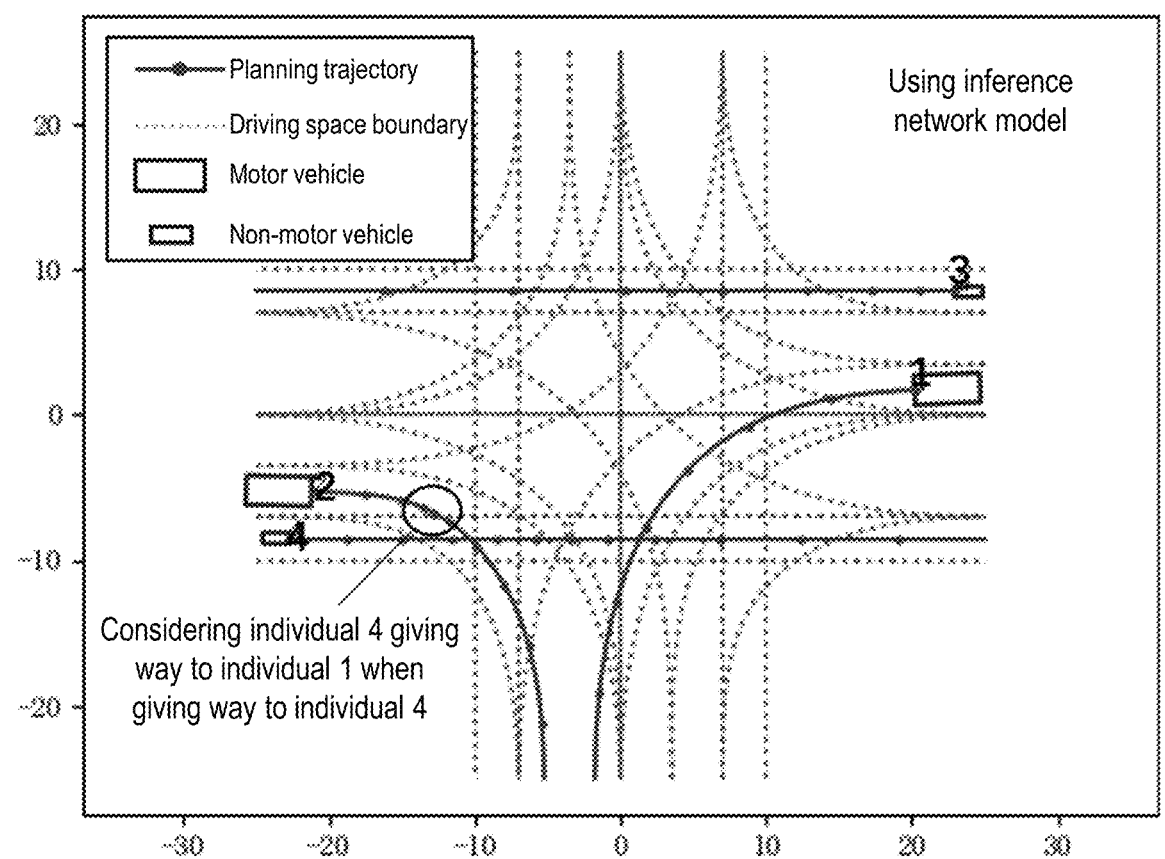
FIG. 6 is a performance effect diagram of the hybrid traffic flow motion behavior modeling method based on the inference graph provided in the embodiment of the present invention after behavior modeling.
Figure 7:
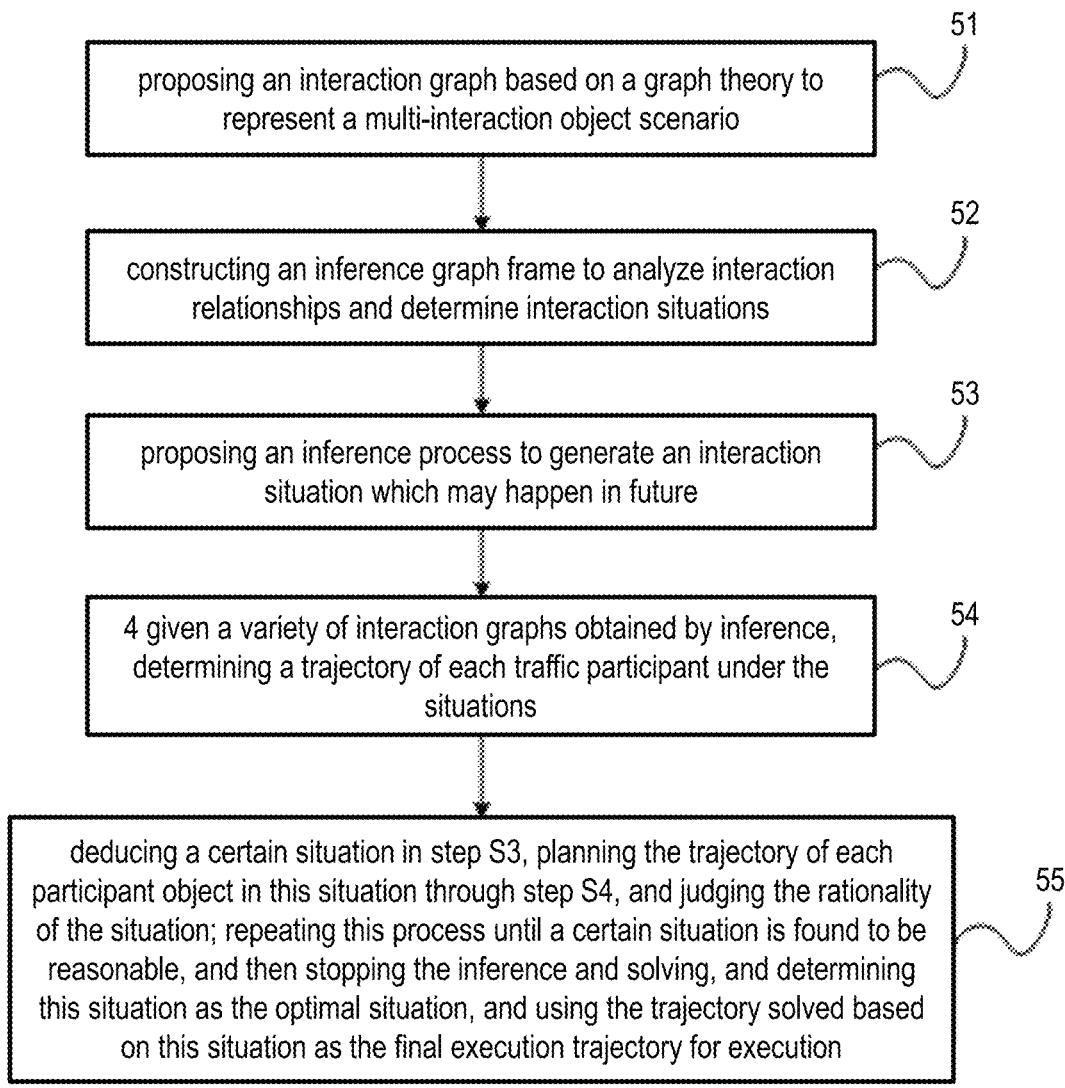
FIG. 7 is a scenario diagram and a flow diagram of the constructed interaction graph of the hybrid traffic flow motion behavior modeling method based on the inference graph provided in the embodiment of the present invention.

A certain situation is deduced in step (3), the trajectory of each participant in this situation is planned through step (4.1), and the rationality of the situation is judged by applying the decision-making method of (4.2). This process is repeated until a certain situation is found to be reasonable, and then the inference and solving would be stopped. This situation is the optimal situation, and the trajectory solved based on this situation is executed as the final trajectory. The implementation effect is shown in FIG. 6.

Compared with the prior art, the present invention has the following advantages:

(1) The hybrid traffic flow behavior modeling method based on the inference graph proposed by the present invention takes combinations of potential interaction strategy of each traffic participants as the scenarios. From the perspective of the scenarios, the potential scenario of each traffic participant is deduced and identified one by one, which greatly improves the authenticity and reliability of traffic simulation;

(2) The present invention learns a decision-making standard of real drivers and takes it as the standard to judge the rationality of interaction strategies in various scenarios, so that the executed scenarios are more in line with driving habits of human drivers, which further improves the authenticity and credibility of the model; and (3) The trajectory-based motion behavior model proposed by the present invention can adapt to the construction and simulation requirements of the intelligent vehicle virtual test for the two-dimensional plane multi-interaction environment of the hybrid traffic flow, meet the requirements of the intelligent vehicle virtual test for the highly realistic background traffic flow simulation model, and have an important promoting role and practical value for the realization of high-level intelligent driving.

Preferred concrete embodiments of the present invention are described in detail above. It should be understood that an ordinary person skilled in the art can make many modifications and changes according to the concept of the present invention without creative work. Therefore, any technical solution which can be obtained by a person skilled in the art on the basis of the prior art through logical analysis, inference or limited experiments according to the concept of the present invention shall be within the protection scope of determined by the claims.

The invention claimed is:

1. A hybrid traffic flow motion behavior modeling method based on an inference graph, wherein the method comprises the following steps:

an interaction graph construction step: obtaining scene information, representing all traffic participants in the scene as vertices, and using directed edges to represent interaction relationships among traffic participants, so as to obtain the interaction graph;

an interaction situations generation step: obtaining all possible interaction situations according to the interaction graph;

a rationality judgment step: obtaining an interaction situation from the interaction situation generation step, estimating the trajectory of each traffic participant in the interaction scenario, and judging whether the trajectory conforms to a preset empirical decision-making criteria, so as to judge rationality of the interaction situation; and a circular execution step: executing the rationality judgment step in a circular manner, and judging the rationality of all possible interaction situations obtained in the interaction situation generation step in turn until an interaction situation satisfying the rationality is found, and taking a trajectory of each traffic participant corresponding to the interaction situation as a final execution trajectory, wherein the interaction relationships in the interaction graph construction step are specifically expressed as follows:

defining that two individuals having linear overlap characteristics on future driving trajectories are said to have a physical interaction relationship, wherein the two individuals are connected by a one-way solid line, and an arrow direction represents an upstream and downstream relationship; and defining that two individuals having an intersection point on future driving trajectories are said to have a logical interaction relationship, wherein since the upstream and downstream relationship has not been determined, the two individuals are connected by a two-way dotted line, wherein the interaction situation generation step is specifically as follows:

considering a turning vehicle as a core interaction object;

when there is only one core interaction object in the scene, determining a gap in each traffic flow, and from a perspective of the core interaction object, adopting a depth-first strategy from a downstream gap to an upstream gap to determine a possible interaction situation;

when there are two or more core interaction objects in the scene, putting a core interaction object into the interaction graph firstly to determine a possible interaction situation, and then adding other core interaction objects in turn to the determined interaction situation to further determine a possible interaction situation; and if a core interaction object added later affects downstream traffic participants of a previous core interaction object, removing the affected core interaction object from the interaction graph, re-determining an interaction relationship, and then adding the removed core interaction object into the interaction graph to obtain a final interaction situation, wherein in the rationality judgment step, a trajectory estimation process of each traffic participant is specifically as follows:

utilizing a fourth-order Bessel curve to represent movement paths of the traffic participants; and utilizing an intelligent driver model as a speed planning model to determine speeds of the traffic participants, wherein in the rationality judgment step, the decision-making criteria comprises: from a perspective of the current traffic participant, selecting waiting time and delay to make an interaction decision-making; and from a perspective of other interaction objects, selecting cooperative acceleration and delay to make an interaction decision-making.

2. The hybrid traffic flow motion behavior modeling method based on an inference graph according to claim 1, wherein different traffic flows are determined according to types of the traffic participants.

3. The hybrid traffic flow motion behavior modeling method based on an inference graph according to claim 1, wherein five control points are used to determine a shape of the fourth-order Bessel curve, and a calculation expression of the shape of the curve is as follows:

$$B(u) = \sum_{i=0}^{4} b_{i,n}(u) B_i$$

wherein B(u) represents points of the curve when the parameter u changes in an interval [0,1], and is a two-dimensional matrix containing x and y coordinates of all points, i.e., $B(u)=[B_x(u), B_y(u)]$; B(0) and B(1) are two ends of the curve; $B_i=(X_i, Y_i)$ is a control point of the Bessel curve; $b_{i,n}(u)$ is a Bornsky polynomial.

4. The hybrid traffic flow motion behavior modeling method based on an inference graph according to claim 3, wherein a quadratic power sum of curvature change is selected as an objective function for planning of the paths, and constraints are set to ensure continuity of curve endpoints, and a calculation expression of the objective function is as follows:

$$\min F = \int_0^1 B_x'''(u)^2 + B_y'''(u)^2 du$$

calculation expressions of the constraints are as follows:

$$\begin{cases} B_0 = (x_s, y_s) \\ B_4 = (x_e, y_e) \\ B'(0) = d_s[\cos(\theta_s), \sin(\theta_s)] \\ B'(1) = d_e[\cos(\theta_s), \sin(\theta_s)] \\ k(0) = k_s \\ k(1) = k_e \end{cases}$$

wherein $(x_s, y_s)$ is coordinates of a starting point; $(x_e, y_e)$ is coordinates of an end point; $\theta_s$ is a direction angle of the starting point; $k_s$ is a curvature of the starting point; and $k_s$ is a curvature of the end point.

5. The hybrid traffic flow motion behavior modeling method based on an inference graph according to claim 1, wherein a determination process of the speeds of the traffic participants is specifically as follows:

if there is no other object in a downstream of the current object, considering that the current object travels in accordance with an expected acceleration; and if there are other objects in the downstream of the current object, utilizing the intelligent driver model as a following model, and determining a speed of the current object based on an object ahead thereof, wherein a calculation expression of an acceleration of the current object determined according to the IDM model is as follows:

$$a_{IDM}(s, v, \Delta v) = a_{xmax}\left[1 - \left(\frac{v}{v_d}\right)^\delta - \left(\frac{s^*(v, \Delta v)}{s}\right)^2\right]$$

$$s^*(v, \Delta v) = s_0 + vT + \frac{v\Delta v}{2\sqrt{a_{max}a_{dd}}}$$

wherein $a_{IDM}(s, v, \Delta v)$ is an acceleration of the current object determined according to the IDM model; $a_{max}$ is a maximum acceleration; add is an expected deceleration; $v_d$ is an expected speed; $\delta$ is a free acceleration index, $s^*(v, \Delta v)$ is an effective minimum gap; $s_0$ is a minimum stopping distance; T is an expected time interval; $a_{dd}$ is an expected deceleration, v is a speed of the current vehicle, and $\Delta v$ is a speed difference between the front vehicle and the current vehicle.

6. The hybrid traffic flow motion behavior modeling method based on an inference graph according to claim 1, wherein calculation expressions of the cooperative acceleration and delay are as follows:

$$a_c = \begin{cases} \dfrac{v_I^2}{2d_I}, & d_I < 0.5 v_I t_E \\ 2\dfrac{v_I t_E - d_I}{t_E^2}, & 0.5 v_I t_E \leq d_I < v_I t_E \\ 2\dfrac{d_I - v_I t_E}{t_E^2} & , v_I t_E \leq d_I \end{cases}$$

$$D = \begin{cases} t_E + \dfrac{v_E}{a_{da}} - \dfrac{d_E}{v_I}, & d_I < 0.5 v_I t_E \\ 0.5 t_E + \dfrac{v_E}{a_{da}} - \dfrac{d_E}{a_{da} t_E}, & 0.5 v_I t_E \leq d_I < v_I t_E \\ 0 & , v_I t_E < d_I \end{cases}$$

wherein $a_c$ is the cooperative acceleration, D is the delay, and $v_I$ is a current speed of the interaction object; $d_I$ is a distance between the interaction object and a conflict point; $t_E$ is the time when the current vehicle arrives at the conflict point; $d_E$ is a distance between the current vehicle and the conflict point; and $a_{da}$ is an expected acceleration of the vehicle; and utilizing a decision-making tree method to establish the decision-making criteria for learning the behavior of both parties of interaction from empirical data.

* * * * *